United States Patent
Hayakawa

(10) Patent No.: US 9,874,709 B2
(45) Date of Patent: Jan. 23, 2018

(54) OPTICAL FUNCTIONAL DEVICE, OPTICAL RECEIVING APPARATUS AND OPTICAL TRANSMISSION APPARATUS

(71) Applicants: FUJITSU LIMITED, Kawasaki-shi, Kanagawa (JP); Photonics Electronics Technology Research Association, Bunkyo-ku (JP)

(72) Inventor: Akinori Hayakawa, Sagamihara (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 105 days.

(21) Appl. No.: 14/955,600

(22) Filed: Dec. 1, 2015

(65) Prior Publication Data

US 2016/0161691 A1    Jun. 9, 2016

(30) Foreign Application Priority Data

Dec. 3, 2014    (JP) ................ 2014-245400

(51) Int. Cl.
*G02B 6/10*    (2006.01)
*H01L 31/10*    (2006.01)
(Continued)

(52) U.S. Cl.
CPC ......... *G02B 6/4295* (2013.01); *G02B 6/2726* (2013.01); *G02B 6/2934* (2013.01);
(Continued)

(58) Field of Classification Search
CPC ........ G02B 6/42; G02B 6/122; G02B 6/4295; G02B 6/2726; G02B 6/2934;
(Continued)

(56) References Cited

U.S. PATENT DOCUMENTS 7,675,130 B2 *    3/2010    Nakaji .................. H01L 31/105
                                                                257/200
2001/0021299 A1 *    9/2001    Hamamoto ........ G02B 6/12007
                                                                385/131

FOREIGN PATENT DOCUMENTS

JP    2010-091900    4/2010
JP    2010-287623    12/2010

OTHER PUBLICATIONS

Long Chen et al., "Polarization-Diversified DWDM Receiver on Silicon Free of Polarization-dependent Wavelength Shift", OFC/NFOEC Technical Digest, 2012 OSA (3 pages).

(Continued)

*Primary Examiner* — Seung C Sohn
(74) *Attorney, Agent, or Firm* — Kratz, Quintos & Hanson, LLP

(57) ABSTRACT

An optical functional device includes: a photodetector; a first optical waveguide which is connected to one end face of the photodetector; and a second optical waveguide which is connected to the other end face of the photodetector. The photodetector is formed in a multi-mode interferometer and has electrodes. Light input from the first optical waveguide to the photodetector focuses image at a position physically away from the second optical waveguide, and light input from the second optical waveguide to the photodetector focuses image at a position physically away from the first optical waveguide.

12 Claims, 15 Drawing Sheets

(51) Int. Cl.
*G02B 6/42* (2006.01)
*G02B 6/27* (2006.01)
*G02B 6/293* (2006.01)
*G02B 6/12* (2006.01)

(52) U.S. Cl.
CPC ............. *G02B 6/29382* (2013.01); *G02B 2006/12138* (2013.01); *G02B 2006/12142* (2013.01)

(58) Field of Classification Search
CPC ...... G02B 6/29382; G02B 2006/12138; G02B 2006/12142
USPC ............. 250/227.21; 385/131; 257/431
See application file for complete search history.

(56) References Cited

OTHER PUBLICATIONS

Lucas B. Soldano et al., "Optical Multi-Mode Interference Devices Based on Self-Imaging: Principles and Applications", Journal of Lightwave Technology, Vol. 13, No. 4, Apr. 1995, pp. 615-627 (13 pages).

* cited by examiner

OPTICAL FUNCTIONAL DEVICE, OPTICAL RECEIVING APPARATUS AND OPTICAL TRANSMISSION APPARATUS

CROSS-REFERENCE TO RELATED APPLICATION

This application is based upon and claims the benefit of priority of the prior Japanese Patent Application No. 2014-245400, filed on Dec. 3, 2014, the entire contents of which are incorporated herein by reference.

FIELD

The embodiments discussed herein are directed to an optical functional device, an optical receiving apparatus and an optical transmission apparatus.

BACKGROUND

In recent years, an optical functional device on a silicon substrate using a silicon electronic circuit manufacturing technology which is low in cost and capable of large-scale integration has been attracted attention. In a high performance server, a super computer, and so on, high computing power was realized by a multi-core CPU or the like to meet the demand of increasing in required processing power. On the other hand, conventional electrical transmission between chips and between boards is going to face the limit because of the signal speed and transmission length. A large-scaled optical communication device on a silicon substrate based on a low-loss and small-sized silicon-wire waveguide, so-called a silicon photonics is expected as a technology to solve problems of lack of communication capacity of an above-stated speeding up information processing device. Especially, an application of a wavelength division multiplexer (WDM) technology which is practically used in telecommunication system to the silicon photonics is expected to have an effect on enabling high density of transmission capacity and reduction in optical cables, and research and development thereof have been widely advanced.

In an optical transmitter/receiver using the silicon photonics, an optical transmitter is made up of a light source, an optical modulator, and so on, and an optical receiver is made up of a photodetector, or the like. Optical fibers connect between the optical transmitter and the optical receiver. In this case, a signal light input to the optical receiver has an irregular polarization state resulting from a change of a stress applied to the optical fiber and a change of a temperature. This becomes particularly a large problem in a WDM transmission system which requires an optical demultiplexer or the like whose polarization dependence is large.

For example, a polarization diversity optical receiver as illustrated in FIG. 15 (or refer to Non-Patent Document 1) has been proposed to deal with the above-stated problem.

In this polarization diversity optical receiver, when a WDM input signal light which is in the irregular polarization state is input to a polarization beam splitter 101, the signal light is separated into a TE polarization light and a TM polarization light. The TM polarization light is input to a polarization rotator 102 to be rotated to the TE polarization light. The signal lights separated into two lights as stated above are each input to an optical demultiplexer as the TE polarization light. A ring optical resonator or an AWG filter is used as the optical demultiplexer, but here, a bidirectional input type ring optical resonator 103 is exemplified as the optical demultiplexer. The two TE polarization lights split into separated lights are input to the ring optical resonator 103 from opposite directions, the TE polarization light matching a resonant wavelength of the ring optical resonator 103 is coupled to a drop port 104 which is optically coupled to the ring optical resonator 103, and input to a photodetector 105 formed next thereto. As stated above, the WDM input signal light is once separated into the TE polarization light and the TM polarization light, and further, the TM polarization light is rotated into the TE polarization light, and thereby, an optical signal receiving which is independent from the polarization state of the input signal light is enabled.

[Patent Document 1] Japanese Laid-open Patent Publication No. 2010-287623

[Patent Document 2] Japanese Laid-open Patent Publication No. 2010-91900

[Non-Patent Document 1] Long Chen, Christopher R. Doerr, and Young-kai Chen, OFC/NFOEC Technical Digest, 2012

[Non-Patent Document 2] Lucas B. Soldano and Erik C. M. Pennings, JOURNAL OF LIGHTWAVE TECHNOLOGY, VOL. 13, NO. 4, APRIL 1995

As stated above, the polarization diversity optical receiver is used, and thereby, an optical signal receiving which is independent from a polarization state of an input signal light can be obtained, but the signal lights are input from both directions of the photodetector 105 according to the structure as illustrated in FIG. 15. Therefore, if a photodetector length is not set to be enough long, there is a problem in which transmission light is output to each facing input port, the output transmission light is output as an optical feedback toward inside/outside the optical receiver via the ring optical resonator 103, and causes noises and malfunctions. On the other hand, when the photodetector length is set to be long so that the transmission light from the photodetector 105 becomes enough small, there is a problem in which a capacitance increases and a frequency response bandwidth is deteriorated.

SUMMARY

An aspect of an optical functional device includes: a photodetector which is formed in a multi-mode interferometer and has electrodes; a first optical waveguide which is connected to one end face of the photodetector; and a second optical waveguide which is connected to the other end face of the photodetector, wherein light input from the first optical waveguide or the second optical waveguide, or from the first optical waveguide and the second optical waveguide to the photodetector is separated into lights in a plurality of propagation modes, the separated lights propagate in the photodetector while interfering, and a photocurrent generated by photoelectrically converting the lights is detected from the electrodes, the light input from the first optical waveguide to the photodetector focuses image at a position physically away from the second optical waveguide, and the light input from the second optical waveguide to the photodetector focuses image at a position physically away from the first optical waveguide.

An aspect of an optical receiving apparatus includes: an optical separation part which separates input light into TE polarization light and TM polarization light; an optical rotation part which rotates the TM polarization light into the TE polarization light; an optical demultiplexing part which demultiplexes the TE polarization light in accordance with a wavelength; and an optical functional device which receives the demultiplexed TE polarization light, wherein the optical functional device includes: a photodetector which is formed in a multi-mode interferometer and has electrodes; a first optical waveguide which is connected to one end face of the photodetector; and a second optical waveguide which is connected to the other end face of the photodetector, wherein light input from the first optical waveguide or the second optical waveguide, or from the first optical waveguide and the second optical waveguide to the photodetector is separated into lights in a plurality of propagation modes, the separated lights propagate in the photodetector while interfering, and a photocurrent generated by photoelectrically converting the lights is detected from the electrodes, the light input from the first optical waveguide to the photodetector focuses image at a position physically away from the second optical waveguide, and the light input from the second optical waveguide to the photodetector focuses image at a position physically away from the first optical waveguide.

An aspect of an optical transmission apparatus includes: a light source; an optical waveguide in which one end is an input part of light emitted from the light source and the other end is an output part of signal light; an optical modulator which is connected to the optical waveguide; and an optical functional device which is connected to the optical modulator, wherein the optical functional device includes: a photodetector which is formed in a multi-mode interferometer and has electrodes; a first optical waveguide which is connected to one end face of the photodetector; and a second optical waveguide which is connected to the other end face of the photodetector, wherein light input from the first optical waveguide or the second optical waveguide, or from the first optical waveguide and the second optical waveguide to the photodetector is separated into lights in a plurality of propagation modes, the separated lights propagate in the photodetector while interfering, and a photocurrent generated by photoelectrically converting the lights is detected from the electrodes, the light input from the first optical waveguide to the photodetector focuses image at a position physically away from the second optical waveguide, and the light input from the second optical waveguide to the photodetector focuses image at a position physically away from the first optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

First Embodiment

Hereinafter, an optical functional device including a photodetector according to a first embodiment is described in detail with reference to the drawings.

—Configuration of Optical Functional Device—

Figure 1A:
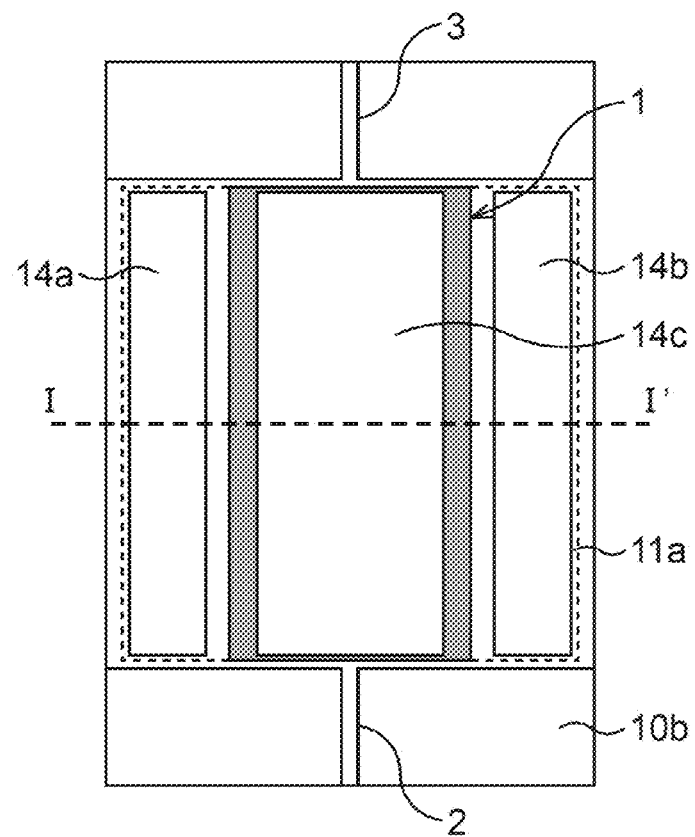
FIGS. 1A and 1B are schematic views each illustrating an optical functional device according to a first embodiment.
Figure 1B:
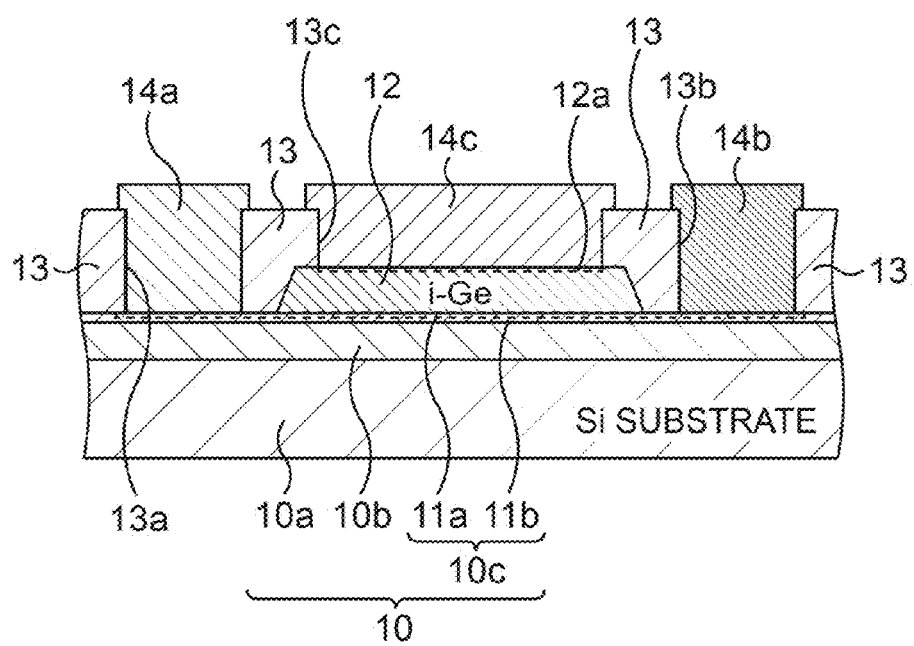

FIGS. 1A and 1B are schematic views illustrating the optical functional device according to the first embodiment, where FIG. 1A is a plan view, and FIG. 1B is a sectional view along a dotted line I-I' in FIG. 1A.

This optical functional device is formed on an SOI (silicon on insulator) substrate 10, and includes a photodetector 1, a first optical waveguide 2 which is connected to one end face of the photodetector 1, and a second optical waveguide 3 which is connected to the other end face of the photodetector 1.

The SOI substrate 10 is made up by forming an SOI layer 10c on an silicon (Si) substrate 10a with an Si oxide layer 10b therebetween.

The photodetector 1 is one in which a signal light input to the photodetector 1 is separated into a plurality of propagation modes, the separated lights propagate while being absorbed and attenuated, and focus image at a specific point by intermodal interference. In the embodiment, the photodetector 1 is called as a photodetector in a multi-mode interference (MMI) type (refer to Non-Patent Document 2). The photodetector 1 is formed by including a p-type Si region 11a which is formed by doping a p-type impurity into a surface layer part of the SOI layer 10c, an i-germanium (Ge) layer 12 which is formed thereon, and an n-type Ge region 12a which is formed by doing an n-type impurity into a surface layer part of the i-Ge layer 12.

The first optical waveguide 2 is a part other than the p-type Si region 11a of the SOI layer 10c, and is formed by etching a p⁻-type Si region 11b which is formed by doping the p-type impurity at a lower concentration than the p-type Si region 11a. The first optical waveguide 2 is formed to be connected to the one end face of the photodetector 1, and a signal light input from the first optical waveguide 2 is input to the photodetector 1 from the one end face of the photodetector 1, is evanescently coupled to the i-Ge layer 12 as it propagates at a p-type Si layer of the p-type Si region 11a, and is absorbed by the i-Ge layer 12. Here, the first optical waveguide 2 may be formed to be butt-joint coupled to the one end face of the photodetector 1.

The second optical waveguide 3 is a part other than the p-type Si region 11a of the SOI layer 10c, and is formed by etching the p⁻-type Si region 11b which is formed by doping the p-type impurity at the lower concentration than the p-type Si region 11a. The second optical waveguide 3 is formed to be connected to the other end face of the photodetector 1, and a signal light input from the second optical waveguide 3 is input to the photodetector 1 from the other end face of the photodetector 1, is evanescently coupled to the i-Ge layer 12 as it propagates at a p-type Si layer of the p-type Si region 11a, and is absorbed by the i-Ge layer 12. Here, the second optical waveguide 3 may be formed to be butt-joint coupled to the other end face of the photodetector 1.

The first optical waveguide 2 and the second optical waveguide 3 are input waveguides to input the signal light to the photodetector 1 made up of Ge whose refractive index is higher than Si, and are formed at positions facing with the photodetector 1 therebetween.

In this optical functional device, a cladding layer 13 of a silicon oxide or the like which covers the SOI layer 10c and the photodetector 1 is formed. A pair of contact holes 13a, 13b which expose a part of a surface of the p-type Si region 11a, and a contact hole 13c which exposes a part of a surface of the n-type Ge region 12a are formed at the cladding layer 13. The contact holes 13a, 13b, 13c are each embedded by a metal, for example, aluminum (Al), and electrodes 14a, 14b, 14c are formed. A pair of electrodes 14a, 14b are electrically connected to the p-type Si region 11a, and the electrode 14c is electrically connected to the n-type Ge region 12. It is possible to make a flow of current at the photodetector 1 uniform by disposing the pair of electrodes 14a, 14b in symmetry relative to the electrode 14c as the electrodes which are connected to the p-type Si region 11a. A not-illustrated lead-out wire is connected to each of the pair of electrodes 14a, 14b, and the electrode 14c.

In the optical functional device, the light input from the first optical waveguide 2 (or the second optical waveguide 3) is photoelectrically converted by the photodetector 1 to be a photocurrent. This photocurrent is detected from the pair of electrodes 14a, 14b, and the electrode 14c.

Figure 2:
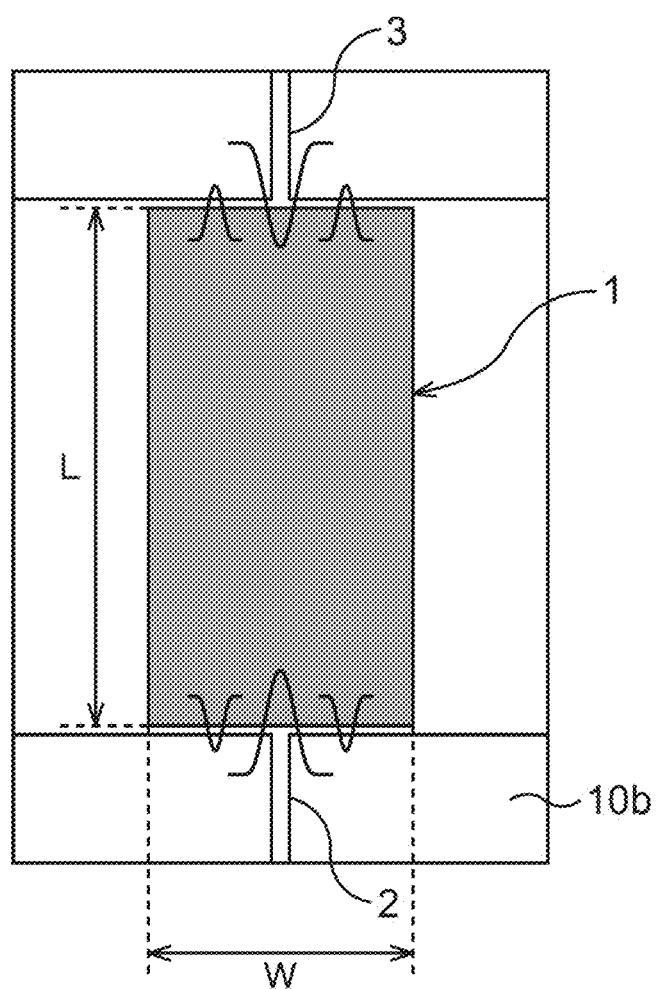
FIG. 2 is a schematic plan view to explain operations of the optical functional device according to the first embodiment.

FIG. 2 is a schematic plan view to explain operations of the optical functional device according to the first embodiment. In FIG. 2, the n-type Ge region and the electrodes are not illustrated for convenience in description.

A length of a long side of the photodetector 1 (photodetector length L) is determined as follows. At first, when a length of a short side of the photodetector 1 (photodetector width) is set to be W, an effective photodetector width $W_e$ is represented by the following expression (1).

[Expression 1]

$$We = W + \left(\frac{\lambda_o}{\pi}\right)\left(\frac{n_c}{n_r}\right)^{2\sigma}(n_r^2 - n_c^2)^{-1/2} \quad (1)$$

Here, $\lambda_0$ is a signal light wavelength in vacuum, $n_c$ is a refractive index of the cladding layer, $n_r$ is an equivalent refractive index of a photodetector part, $\sigma$ is a polarization of signal light, where it is 1 in case of a TE polarization, and "0" (zero) in case of a TM polarization. Where a propagation constant $\beta_v$ at a mode order v is represented by the following expression (2).

(Expression 2)

$$\beta_v \simeq k_o n_r - \frac{(v+1)^2 \pi \lambda_o}{4 n_r W_e^2} \quad (2)$$

Here, $k_0$ is a wave number. Then, a beat length $L_\pi$ at each of minimum and primary modes is represented by the following expression (3).

(Expression 3)

$$L_\pi \approx \frac{\pi}{\beta_0 - \beta_1} \simeq \frac{4 n_r W_e^2}{3 \lambda_o} \quad (3)$$

A position of the image focused by the intermodal interference is represented by this $L_\pi$. When light is input from a center in a width direction of the one end face of the photodetector 1, a distance L from the one end face to first N-fold images by the intermodal interference is represented by the following expression (4).

(Expression 4)

$$L = \frac{3 L_\pi}{4N} \quad (4)$$

In the embodiment, the first optical waveguide 2 is formed at the center in the width direction of the one end face of the photodetector 1, and the second optical waveguide 3 is formed at the center in the width direction of the other end face of the photodetector 1. The photodetector length is set to be the distance L when N=2 is substituted in the expression (4), and thereby, the signal light which is input from the first optical waveguide 2 to the photodetector 1 focuses two images at positions physically away from the second optical waveguide 3, here at right and left two positions of the second optical waveguide 3 at the other end face of the photodetector 1. Similarly, the signal light which is input from the second optical waveguide 3 to the photodetector 1 focuses image at positions physically away from the first optical waveguide 2, here at right and left two positions of the first optical waveguide 2 at the one end face of the photodetector 1. From the expressions (1), (4), specifically, when the wavelength of the signal light is, for example, 1.55 µam, the photodetector 1 is formed to be, for example, a width of 5 µm, and a length of 34.7 µm.

In the embodiment, the photodetector 1 is the MMI type, and therefore, the signal light input to the photodetector 1 is separated into the plurality of propagation modes, and the separated lights propagate in the photodetector 1 while being absorbed by the photodetector 1 and attenuated. The signal lights separated into the plurality of modes cause the intermodal interference while propagating in the photodetector 1 and focus images at a specific point. In the embodiment, the signal light input from the first optical waveguide 2 to the photodetector 1 focuses image at the position physically away from the second optical waveguide 3, and does not focus image at the second optical waveguide 3 which faces the first optical waveguide 2. Similarly, the signal light input from the second optical waveguide 3 to the photodetector 1 focuses image at the position physically away from the first optical waveguide 2, and does not focus image at the first optical waveguide 2 which faces the second optical waveguide 3. A part of the light of the focused image is reflected in the photodetector 1, or cannot be absorbed or attenuated, but the light is negligible. As stated above, the image-forming points are controlled by designing the photodetector 1 to be a size satisfying, for example, a relationship of the expressions (1), (4), and thereby, the signal light which cannot be attenuated in the photodetector 1 focuses image at the position away from the facing first and second optical waveguides 2, 3, and the optical feedback is suppressed. This leads to make the photodetector 1 short and improve an operation frequency bandwidth.

—Manufacturing Method of Optical Functional Device—

FIG. 3A to FIG. 9B are schematic views explaining a manufacturing method of the optical functional device according to the first embodiment in process sequence. In each of FIGS. 3A, 3B, FIGS. 5A, 5B to FIGS. 9A, 9B, A is a plan view, B is a sectional view along a dotted line I-I' in A. In FIGS. 4A to 4C, A is the plan view, B is the sectional view along the dotted line I-I' in A, and C is a sectional view along a dotted line II-II' in A.

Figure 3A:
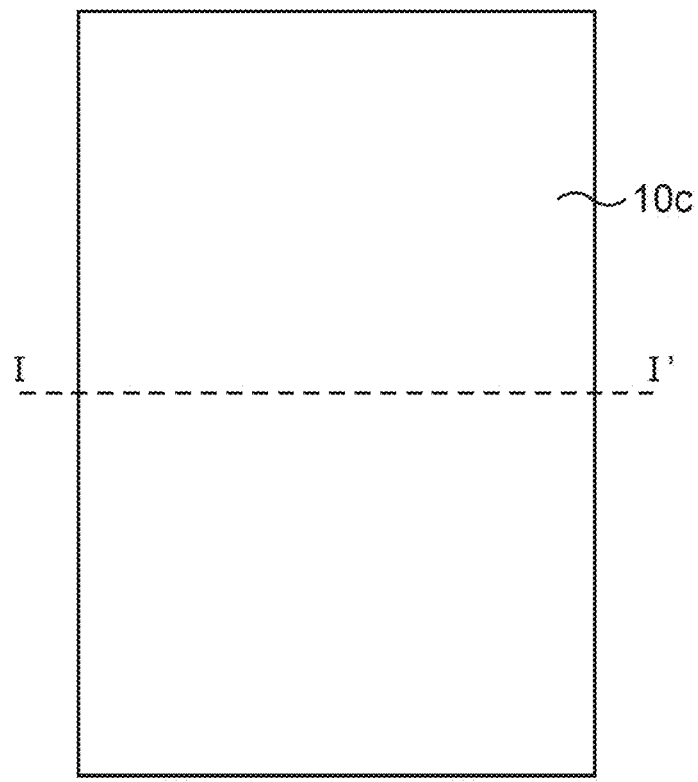
FIGS. 3A and 3B are schematic views explaining a manufacturing method of the optical functional device according to the first embodiment in process sequence.
Figure 3B:
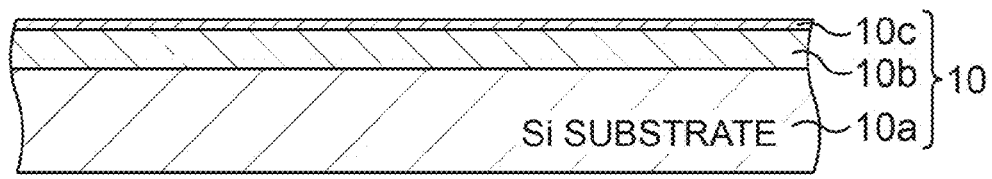

At first, as illustrated in FIGS. 3A, 3B, the SOI substrate 10 is prepared.

The SOI substrate 10 is made up by forming the SOI layer 10c on the Si substrate 10a with the Si oxide layer 10b therebetween. The Si oxide layer 10b is formed to be a thickness of approximately 3.0 μm. The p-type impurity is doped at low concentration into the SOI layer 10c, and the SOI layer 10c is formed to be a thickness of approximately 0.3 μm.

Figure 4A:
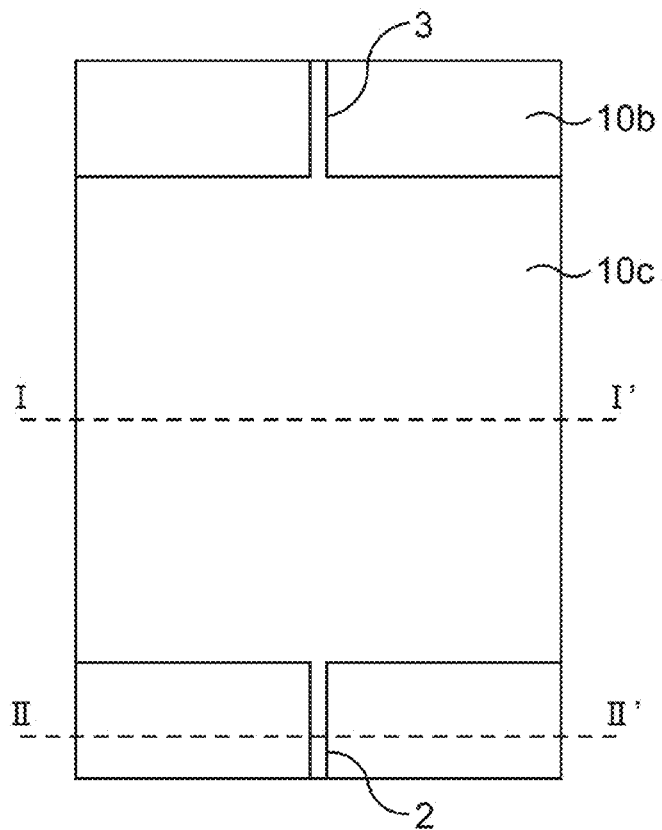
FIGS. 4A to 4C are schematic views explaining the manufacturing method of the optical functional device according to the first embodiment in process sequence subsequent to FIG. 3.
Figure 4B:
Figure 4C:
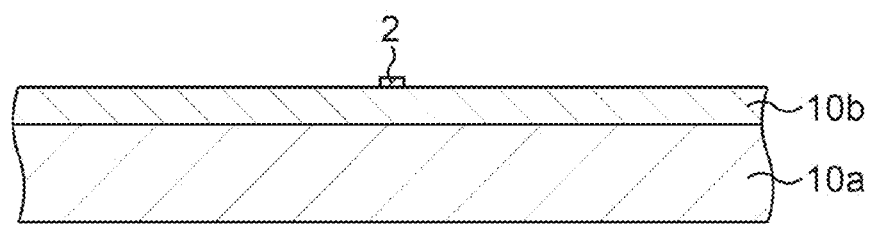

Subsequently, as illustrated in FIGS. 4A to 4C, the SOI layer 10c is etched to form the first optical waveguide 2 and the second optical waveguide 3.

In detail, a resist is coated on the SOI layer 10c, exposure and development are performed by the lithography process using electron beam to form a resist mask in an optical waveguide shape. The SOI layer 10c is, for example, ICP dry-etched by using this resist mask. The resist mask is removed by the ashing or the wet treatment. The first optical waveguide 2 and the second optical waveguide 3 are thereby formed at the facing both end faces of the SOI layer 10c.

Figure 5A:
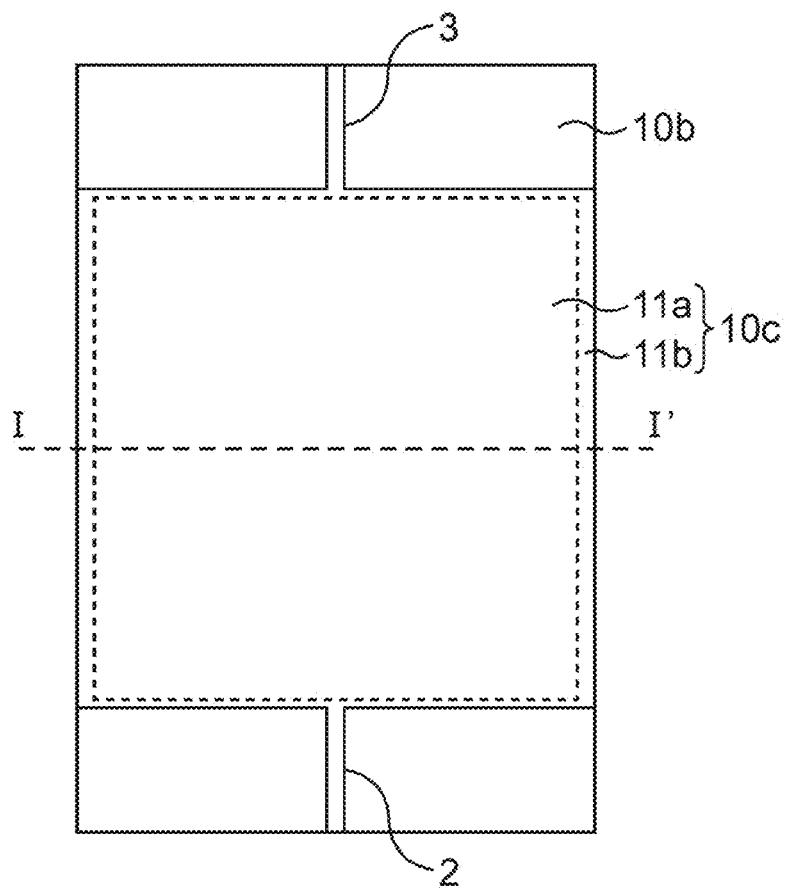
FIGS. 5A and 5B are schematic views each explaining the manufacturing method of the optical functional device according to the first embodiment in process sequence subsequent to FIG. 4.
Figure 5B:
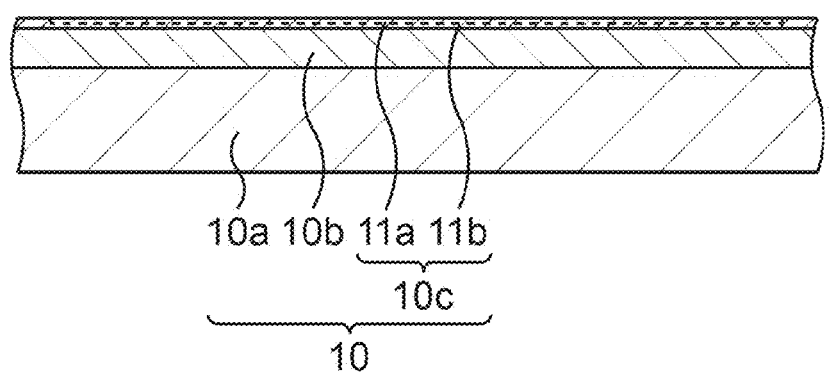

Subsequently, as illustrated in FIGS. 5A, 5B, the p-type Si region 11a is formed at the SOI layer 10c.

In detail, a resist is coated on the SOI layer 10c, exposure and development are performed by the lithography process using i-line to form a resist mask having an opening exposing an electrode formation planned portion. This opening has, for example, a width of approximately 23 μm, and a length of approximately 34.7 μm. The p-type impurity, here boron (B) is ion-implanted into a surface layer part of the electrode formation planned portion of the SOI layer 10c by using this resist mask. The ion-implantation is performed under a condition of, for example, a dose amount of $6.0 \times 10^{14}$ cm$^{-2}$, an implantation energy of approximately 30 keV. The resist mask is removed by the ashing or the wet treatment.

Next, the SOI substrate 10 is put into an annealing apparatus, the annealing is performed at, for example, 1000° C. for 5 seconds to activate B ion. A carrier concentration at approximately $1.0 \times 10^{19}$ cm$^{-3}$ can be obtained by the above-stated series of ion-implantation process and annealing process. The p-type Si region 11a is thereby formed at the SOI layer 10c. The p-type Si region 11a is formed, and thereby, the SOI layer 10c is made up of the p-type Si region 11a and the p$^-$-type Si region 11b which is the part other than the p-type Si region 11a and is formed by doping the p-type impurity at a lower concentration than the p-type Si region 11a.

Figure 6A:
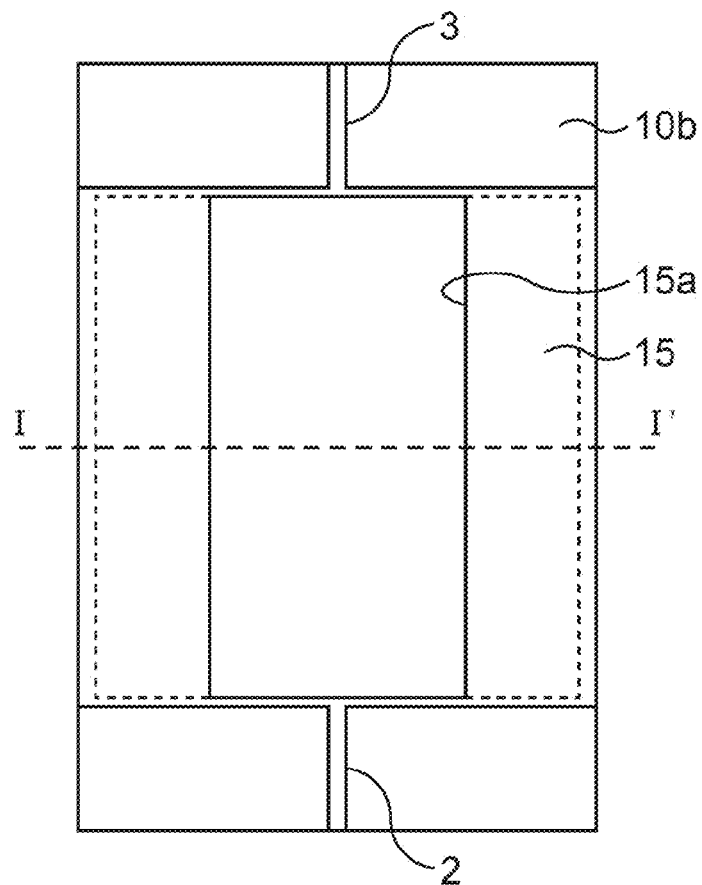
FIGS. 6A and 6B are schematic views each explaining the manufacturing method of the optical functional device according to the first embodiment in process sequence subsequent to FIG. 5.
Figure 6B:
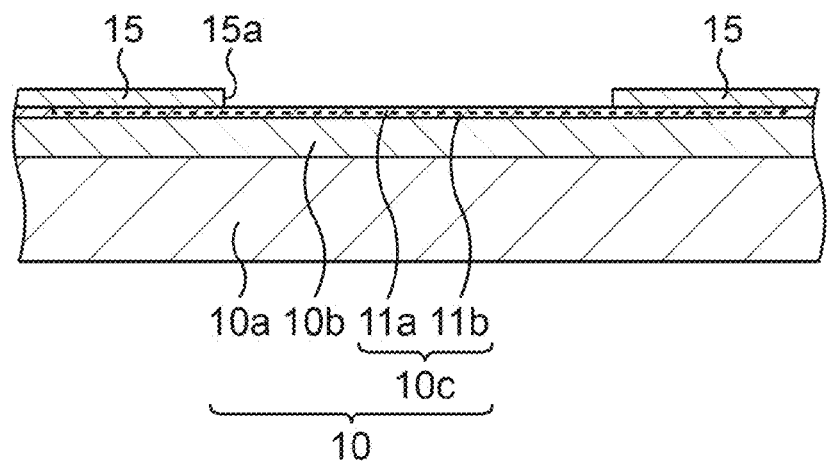

Subsequently, as illustrated in FIGS. 6A, 6B, an SiO$_2$ mask 15 to form a Ge layer is formed.

In detail, an SiO$_2$ film is formed at a whole surface by, for example, the LP-CVD method. A resist is coated on the SiO$_2$ film, exposure and development are performed by, for example, the lithography process using i-line, to form a resist mask having an opening exposing a Ge layer formation planned portion. The SiO$_2$ film is, for example, ICP dry-etched by using this resist mask. The resist mask is removed by the ashing or the wet treatment. The SiO$_2$ mask 15 having an opening 15a exposing the Ge layer formation planned portion of the p-type Si region 11a is thereby formed. The opening 15a has, for example, a width of approximately 5 μm, and a length of approximately 34.7 μm.

Figure 7A:
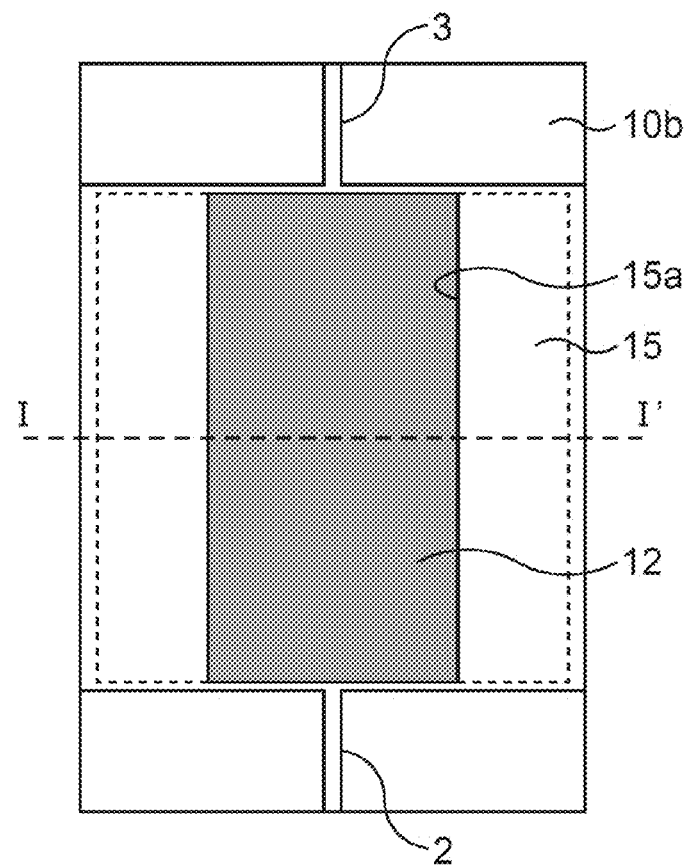
FIGS. 7A and 7B are schematic views each explaining the manufacturing method of the optical functional device according to the first embodiment in process sequence subsequent to FIG. 6.
Figure 7B:
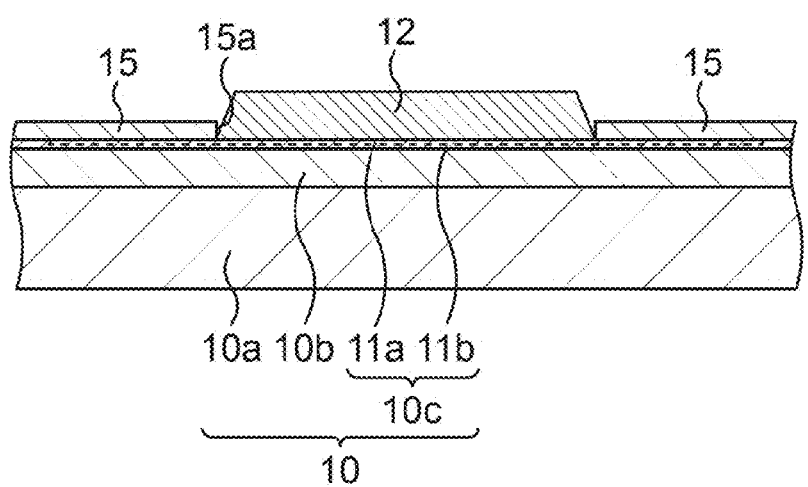

Subsequently, as illustrated in FIGS. 7A, 7B, the i-Ge layer 12 is formed.

In detail, the epitaxial growth of Ge is performed by the LP-CVD method. The SOI substrate 10 where the SiO$_2$ mask 15 is formed is put into a growth chamber, a lamp heater is heated to increase the temperature up to, for example, approximately 900° C. under the H$_2$ atmosphere, the temperature is kept for, for example, 5 minutes to remove O$_2$ adsorbed at a surface. The temperature is decreased to approximately 650° C., GeH$_4$ is supplied when the temperature is stable to grow the Ge layer. A growth condition is, for example, a growth pressure of 10 Torr, a supply amount of GeH$_4$ of 20 ccm, a flow rate of H$_2$ carrier gas of 10 ccm, and a growth time of 35 minutes. At this time, a growth rate is approximately 30 nm/min, and a film thickness of Ge is approximately 1000 nm. The i-Ge layer 12 is thereby formed to embed in the opening 15a of the SiO$_2$ mask 15.

Figure 8A:
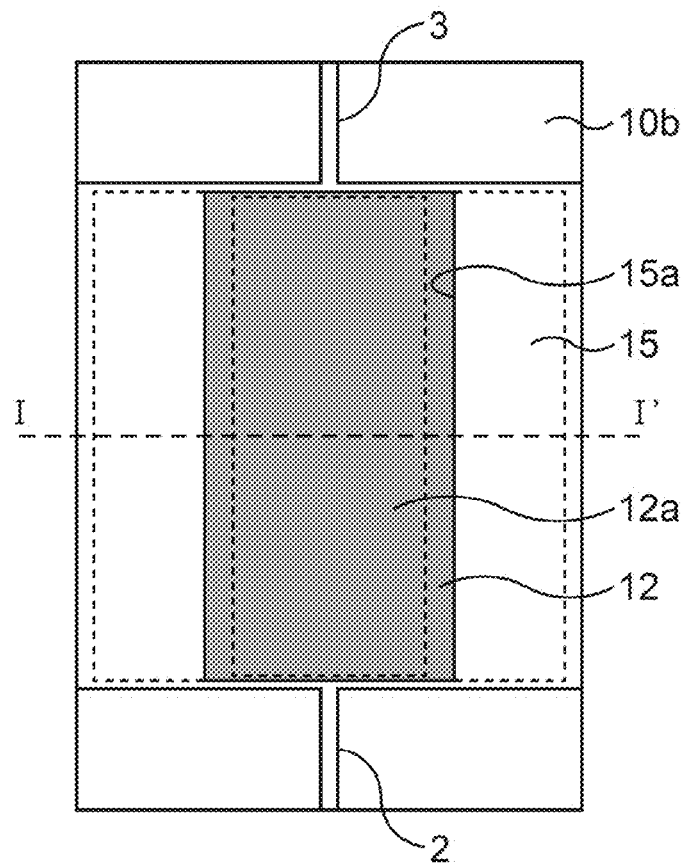
FIGS. 8A and 8B are schematic views each explaining the manufacturing method of the optical functional device according to the first embodiment in process sequence subsequent to FIG. 7.
Figure 8B:
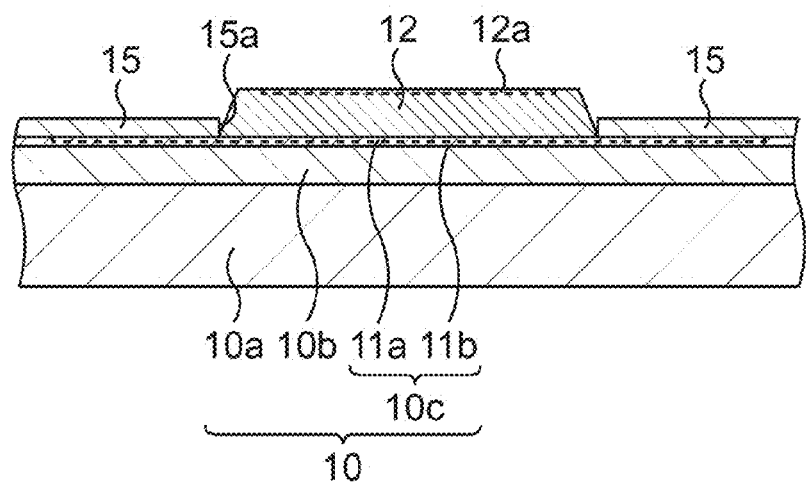

Subsequently, as illustrated in FIGS. 8A, 8B, an n-type Ge region 12a is formed at the surface layer part of the i-Ge layer 12.

In detail, a resist is coated at a whole surface, exposure and development are performed by the lithography process using i-line, to form a resist mask having an opening exposing an n-type Ge formation planned portion. The opening has, for example, a width of approximately 4 μm, and a length of approximately 34.7 μm. The n-type impurity, here phosphorus (P) is ion-implanted into a surface layer part of the n-type Ge formation planned portion by using this mask. The ion-implantation is performed under a condition of, for example, a dose amount of $6.0 \times 10^{14}$ cm$^{-2}$, an implantation energy of approximately 30 keV. The resist mask is removed by the ashing or the wet treatment.

Next, the SOI substrate 10 is put into the annealing apparatus, the annealing is performed at, for example, 700° C. for 5 seconds to activate P ion. A carrier concentration at approximately $1.0 \times 10^{19}$ cm$^{-3}$ can be obtained by the above-stated series of ion-implantation process and annealing process. The n-type Ge region 12a is thereby formed at the surface layer part of the i-Ge layer 12.

Figure 9A:
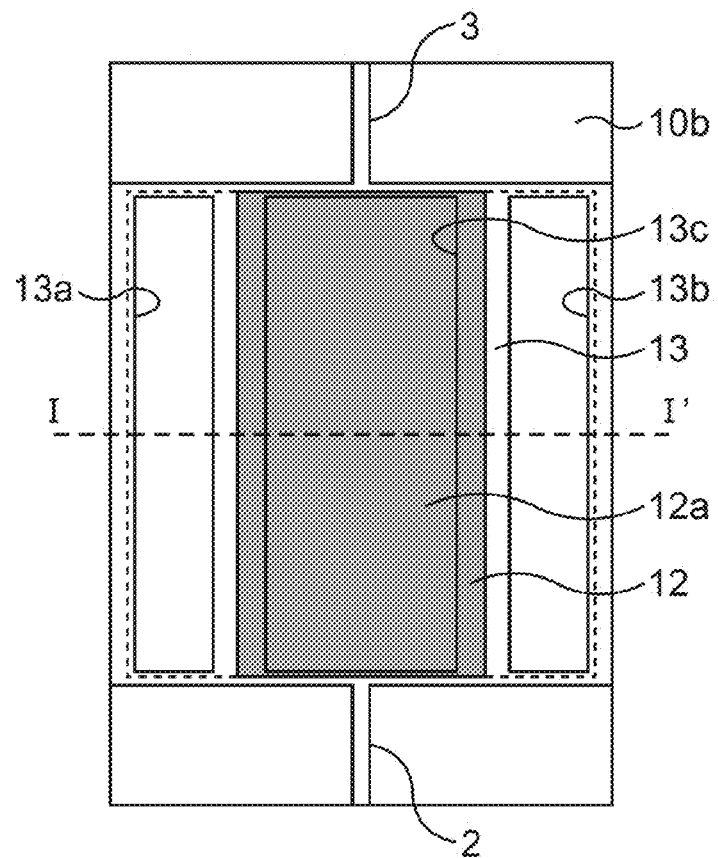
FIGS. 9A and 9B are schematic views each explaining the manufacturing method of the optical functional device according to the first embodiment in process sequence subsequent to FIG. 8.
Figure 9B:
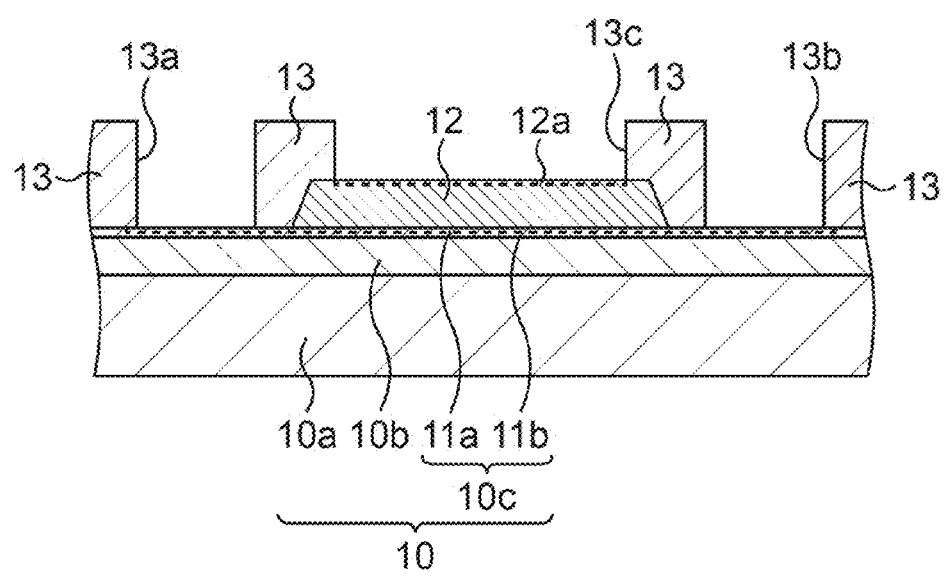

Subsequently, as illustrated in FIGS. 9A, 9B, the cladding layer 13 having the contact holes 13a, 13b, 13c is formed.

In detail, an $SiO_2$ film is formed with a thickness of, for example, approximately 1000 nm at a whole surface by, for example, the plasma-CVD method. A resist is coated on the $SiO_2$ film, exposure and development are performed by, for example, the lithography process using i-line, to form a resist mask having openings exposing contact hole formation planned portions. The $SiO_2$ film is, for example, ICP dry-etched by using this resist mask. The resist mask is removed by the ashing or the wet treatment. The cladding layer 13 having the contact holes 13a, 13b exposing the electrode formation planned portions of the p-type Si region 11a, and the contact hole 13c exposing the electrode formation planned portion of the n-type Ge region 12a is thereby formed. The contact holes 13a, 13b each have, for example, a width of approximately 4 μm, and a length of approximately 34.7 μm. The contact hole 13c has, for example, a width of approximately 4 μm, and a length of approximately 34.7 μm.

Subsequently, the electrodes 14a, 14b, 14c are formed as illustrated in FIGS. 1A, 1B.

In detail, the SOI substrate 10 where the cladding layer 13 is formed is put into a sputtering apparatus, to form an Al film to be a thickness of approximately 500 nm to embed the contact holes 13a, 13b, 13c. A resist is coated on the Al film, exposure and development are performed by, for example, the lithography process using i-line, to form a resist mask covering the electrode formation planned portions. The Al film is dry-etched by using this resist mask. The resist mask is removed by the ashing or the wet treatment. The electrodes 14a, 14b which embed the contact holes 13a, 13b with Al and conduct with the p-type Si region 11a, and the electrode 14c which embeds the contact hole 13c with Al and conducts with the n-type Ge region 12a are thereby formed.

The optical functional device according to the embodiment is thereby formed.

As described hereinabove, according to the embodiment, a high reliability optical functional device which suppresses optical feedback without making a photodetector length long, and prevents noises and malfunctions though a frequency response bandwidth improves is enabled when signal lights are input to the photodetector 1 from both directions.

Note that in the embodiment, the SOI substrate 10 is used as the substrate, but a substrate which is made up by forming a silicon layer on an Si substrate with a nitride film therebetween may be used. Besides, Ge is used as a main material of the photodetector 1, but it is possible to use SiGe. Besides, other semiconductor materials such as InP, GaAs may be used as main materials of the substrate, the photodetector, the optical waveguide, and so on without departing from the spirit of the present invention. A metal material of the electrode is not also particularly limited, and Cu, Au, and so on may be used. Besides, it is possible to freely design the width of the optical waveguide, the width of the photodetector, and so on without departing from the spirit of the present invention. Besides, a taper structure or the like may be applied to the first and second optical waveguides. Besides, the image-forming points of the signal lights passing through the first and second optical waveguides are not necessarily just the end faces of the photodetector, but the image-forming points may be deviated for some extent from the end faces of the photodetector as long as it is within a range in which the optical feedback to the facing input optical waveguides is negligible.

Second Embodiment

Next, a second embodiment is described. In the embodiment, an optical functional device including a photodetector is disclosed as same as the first embodiment, but it is different from the first embodiment in a point that a configuration of an optical waveguide is different. In the embodiment, the same reference numerals are supplied for the same composing members or the like as the optical functional device of the first embodiment, and detailed descriptions are not given.

Figure 10:
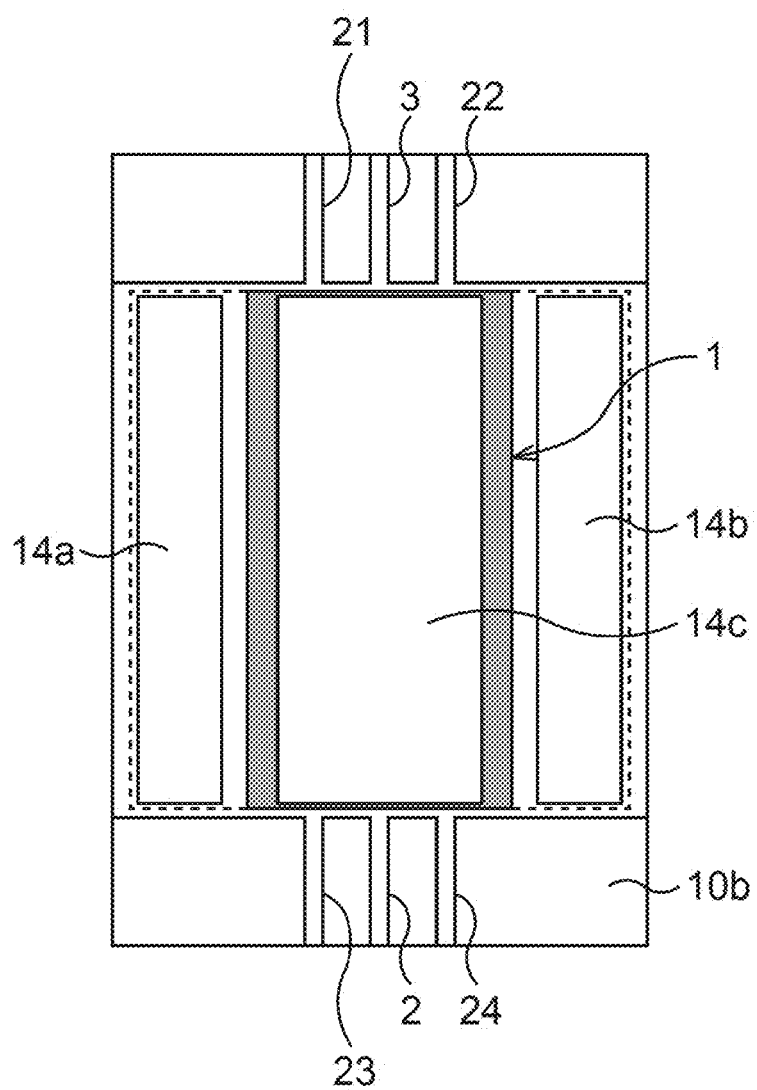
FIG. 10 is a schematic plan view illustrating an optical functional device according to a second embodiment.

FIG. 10 is a schematic plan view illustrating the optical functional device according to the second embodiment.

In the optical functional device, a third optical waveguide 21 and a fourth optical waveguide 22, a fifth optical waveguide 23 and a sixth optical waveguide 24 are formed in addition to the optical functional device according to the first embodiment.

The third optical waveguide 21 and the fourth optical waveguide 22 are output optical waveguides for optical termination in which one ends are respectively connected to right and left two positions of the second optical waveguide 3 at the other end face of the photodetector 1 which is defined in the first embodiment. The third optical waveguide 21 and the fourth optical waveguide 22 are formed such that each one end positions at the image-forming point of the signal light input from the first optical waveguide 2.

The fifth optical waveguide 23 and the sixth optical waveguide 24 are output optical waveguides for optical termination in which one ends are respectively connected to right and left two positions of the first optical waveguide 2 at the one end face of the photodetector 1 which is defined in the first embodiment. The fifth optical waveguide 23 and the sixth optical waveguide 24 are formed such that each one end positions at the image-forming point of the signal light input from the second optical waveguide 3.

Figure 11:
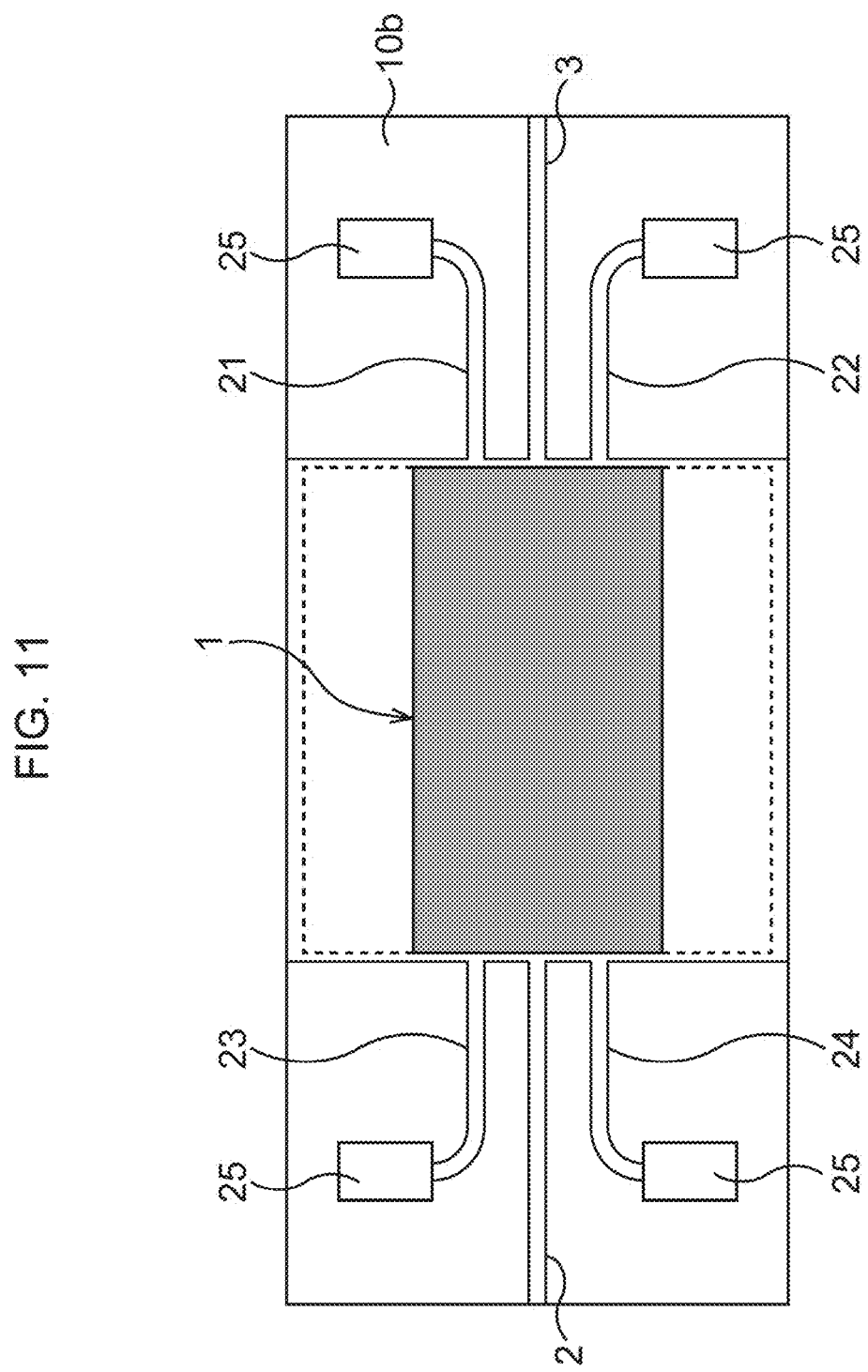
FIG. 11 is a schematic plan view illustrating another example of the optical functional device according to the second embodiment.

The third to sixth optical waveguides 21 to 24 may be formed to be approximately the same width as illustrated in FIG. 11, or may be formed to gradually reduce the width as it goes away from the end face of the photodetector 1 to emit the light toward the substrate side.

The third optical waveguide 21 and the fourth optical waveguide 22, and the fifth optical waveguide 23 and the sixth optical waveguide 24 are formed by the same process as the first optical waveguide 2 and the second optical waveguide 3. Namely, a resist is coated on the SOI layer 10c, exposure and development are performed by the lithography process using electron beam to form a resist mask in a first to a sixth optical waveguide shape. The SOI layer 10c is, for example, ICP dry-etched by using this resist mask. The resist mask is removed by the ashing or the wet treatment. As stated above, the first optical waveguide 2, the fifth optical waveguide 23 and the sixth optical waveguide 24 are each formed at one end face of the SOI layer 10c, and the second optical waveguide 3, the third optical waveguide 21 and the fourth optical waveguide 22 are each formed at the other end face of the SOI layer 10c.

In the optical functional device of the embodiment, the signal light input from the first optical waveguide 2 focuses image at the third and fourth optical waveguides 21, 22 to be output. The signal light input from the second optical waveguide 3 focuses image at the fifth and sixth optical waveguides 23, 24 to be output. In the first embodiment, the signal light focuses image in a vicinity of the end face of the photodetector 1, and therefore, there is a bare possibility in which stray light is generated. However, according to the configuration of the second embodiment, the stray light is removed more certainly, and a negative effect on operations is further suppressed.

As illustrated in FIG. 11 (the n-type Ge region and the electrodes are not illustrated for convenience in illustration), optical absorbers 25 which absorb the light passing through the third to sixth optical waveguides 21 to 24 are respectively connected to the other ends of the third to sixth optical waveguides 21 to 24 to be an optical termination part. The optical absorber 25 is formed while using Ge, SiGe, or the like as a material thereof as same as the photodetector 1. The optical absorbers 25 are provided, and thereby, it is possible to remove the stray light more certainly.

Third Embodiment

Next, a third embodiment is described. In the embodiment, a polarization diversity optical receiver including the optical functional device according to the first or second embodiment is exemplified. In the embodiment, the same reference numerals are supplied for the same composing members or the like as the optical functional device of the first or second embodiment, and detailed descriptions are not given.

Figure 12:
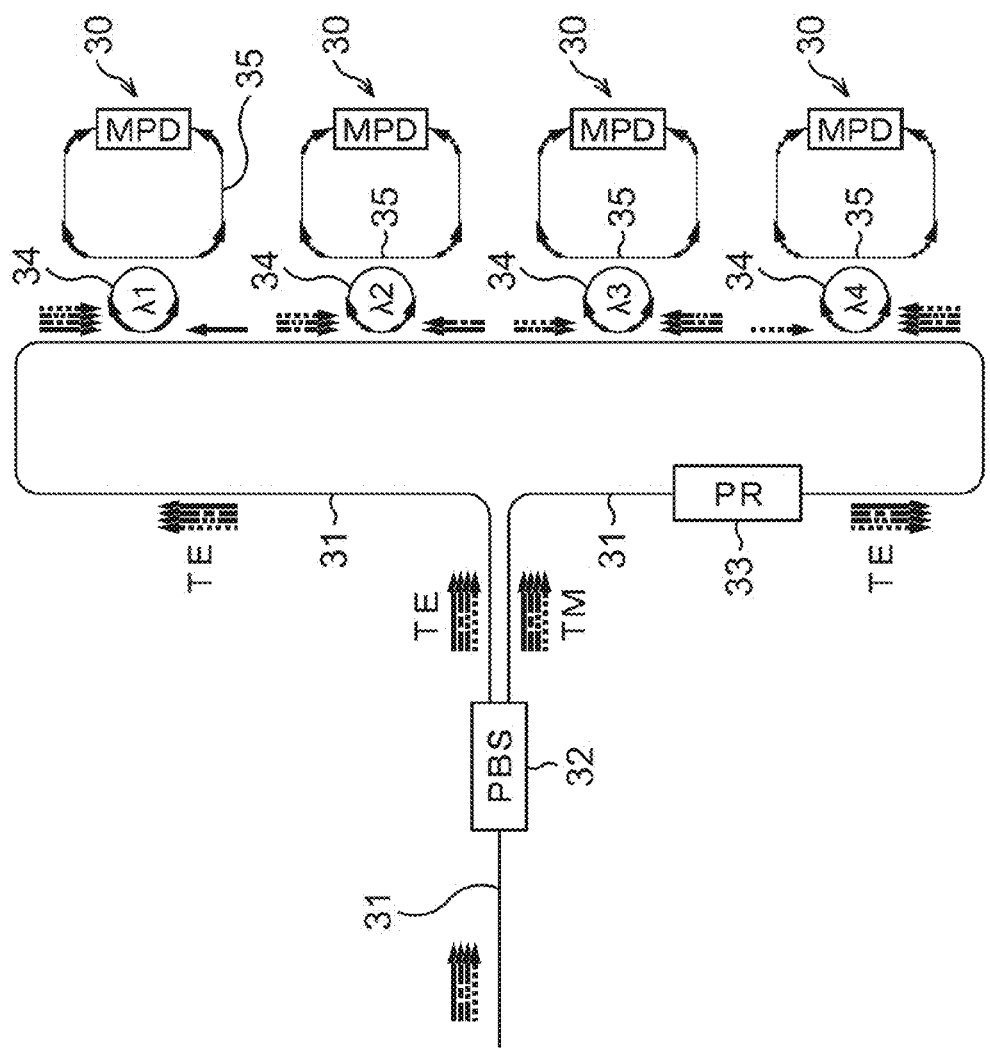
FIG. 12 is a schematic diagram illustrating a schematic configuration of a polarization diversity optical receiver according to a third embodiment.

FIG. 12 is a schematic diagram illustrating a schematic configuration of the polarization diversity optical receiver according to the third embodiment.

The polarization diversity optical receiver includes an input optical waveguide 31, a polarization beam splitter 32 being an optical separation part, a polarization rotator 33 being an optical rotation part, and a plurality (four pieces are exemplified) of ring optical resonators 34 each being an optical demultiplexing part which demultiplexes by every different wavelength (wavelengths λ1 to λ4 are exemplified). An optical functional device 30 according to the first or second embodiment (which is exemplified in FIG. 1, FIG. 10 or FIG. 11) is connected to each ring optical resonator 34 via a drop port 35.

In the polarization diversity optical receiver, the WDM input signal light in the irregular polarization state is input to the input optical waveguide 31, and input to the polarization beam splitter 32, then the signal light is separated into the TE polarization light and the TM polarization light. The TM polarization light is input to the polarization rotator 33 to be rotated into the TE polarization light. The signal lights separated into two lights as stated above are each input to the ring optical resonator 34 being the optical demultiplexer as the TE polarization light. The two TE polarization lights which are split into separated lights are input to the ring optical resonator 34 from opposite directions, then the TE polarization light which matches a resonant wavelength of the ring optical resonator 34 is coupled to the drop port 35 which is optically coupled to the ring optical resonator 34, and further input to the optical functional device 30 formed next thereto. At the optical functional device 30, the signal light is input from the first and second optical waveguides 2, 3 to the photodetector 1 to be absorbed. The signal light which cannot be attenuated in the photodetector 1 is coupled at the positions away from the facing first and second optical waveguides 2, 3, and thereby, the optical feedback is suppressed.

As described hereinabove, according to the embodiment, it is possible to enable the high reliability optical receiver in which the optical feedback is suppressed without making the photodetector length long and the the noises and malfunctions are prevented though the frequency response bandwidth improves when the signal lights are input to the photodetector 1 from both directions by applying the optical functional device 30 according to the first or second embodiment.

Note that a structure of the polarization diversity optical receiver is not limited to the structure illustrated in the embodiment, and for example, one using an AWG filter and an optical demultiplexer made up of a Mach-Zehnder interferometer may be used for the optical demultiplexer.

Fourth Embodiment

Next, a fourth embodiment is described. In the embodiment, an optical transmitter which uses the optical functional device according to the first or second embodiment as a photodetector for monitoring is exemplified. In the embodiment, the same reference numerals are supplied for the same composing members or the like as the optical functional device of the first or second embodiment, and detailed descriptions are not given.

Generally, a silicon photonics optical transmitter is made up by including a laser light source, an optical modulator, an optical multiplexer, and so on. At present, the laser light source is under a state in which a GaAs or InP based III-V group compound semiconductor laser has to be used because silicon is not a direct-transition semiconductor. When the laser light is introduced into a silicon chip, there are a method in which a laser device is provided outside a silicon chip, then the laser light is introduced by a fiber coupling, and a method in which the laser device is mounted on the silicon chip, then an output waveguide of the laser light and an optical waveguide of the silicon chip are directly coupled. In the direct-coupling method by mounting the laser device on the silicon chip, a fiber access is not necessary, and therefore, it is advantageous in points of a cost for fiber mounting, a module size, a coupling loss, and so on compared to the light introduction from outside. Besides, the laser device is mounted on the silicon chip, and thereby, a temperature deviation from the optical modulator, the optical multiplexer, and so on formed at the silicon chip is small, and therefore, it is advantageous in a point of an operation control.

However, there are problems as follows in the direct-coupling method where the laser device is mounted in a viewpoint of inspection of the optical transmitter.

Figure 13:
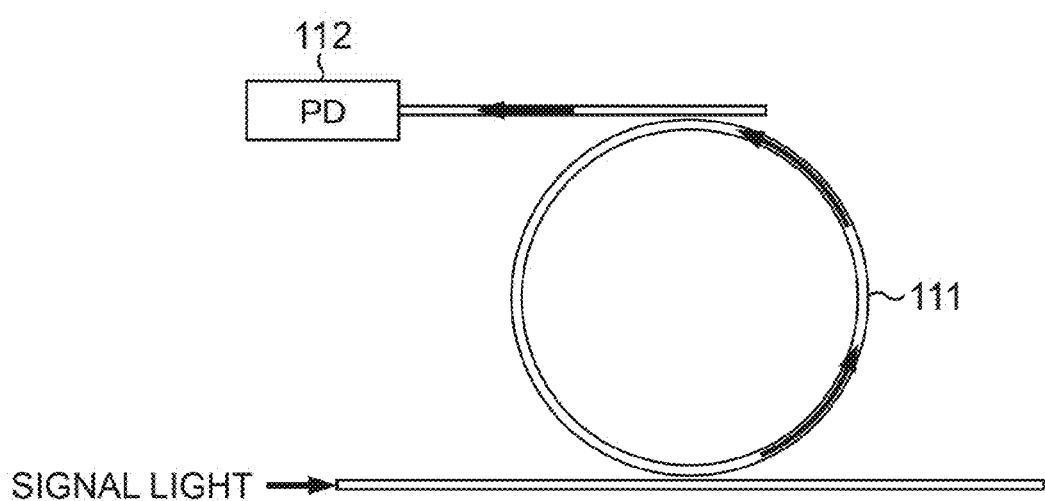
FIG. 13 is a schematic diagram illustrating a schematic configuration of a conventional optical transmitter.

FIG. 13 is a schematic diagram illustrating a schematic configuration of a conventional optical transmitter. At a ring optical modulator 111 where a CW (continuous wave) signal light is input, a part of the modulated signal light is taken into a monitor photodetector 112 to adjust the current signal light and a resonant wavelength of the ring optical modulator 111.

When an optical characteristic inspection of the ring optical modulator 111 is performed, it is necessary to introduce inspection light from an input side of the signal light in the configuration in FIG. 13. It is necessary to mount the laser device or to introduce the light from a portion where the laser device is to be mounted so as to input the light from the signal light side, but the optical characteristic inspection is desirably performed before the laser device is mounted, and it is difficult to introduce the light from the portion where the laser device is to be mounted. There is also a problem that a spectrum inspection cannot be performed after the laser device is mounted because the laser light is fixed wavelength light.

Figure 14:
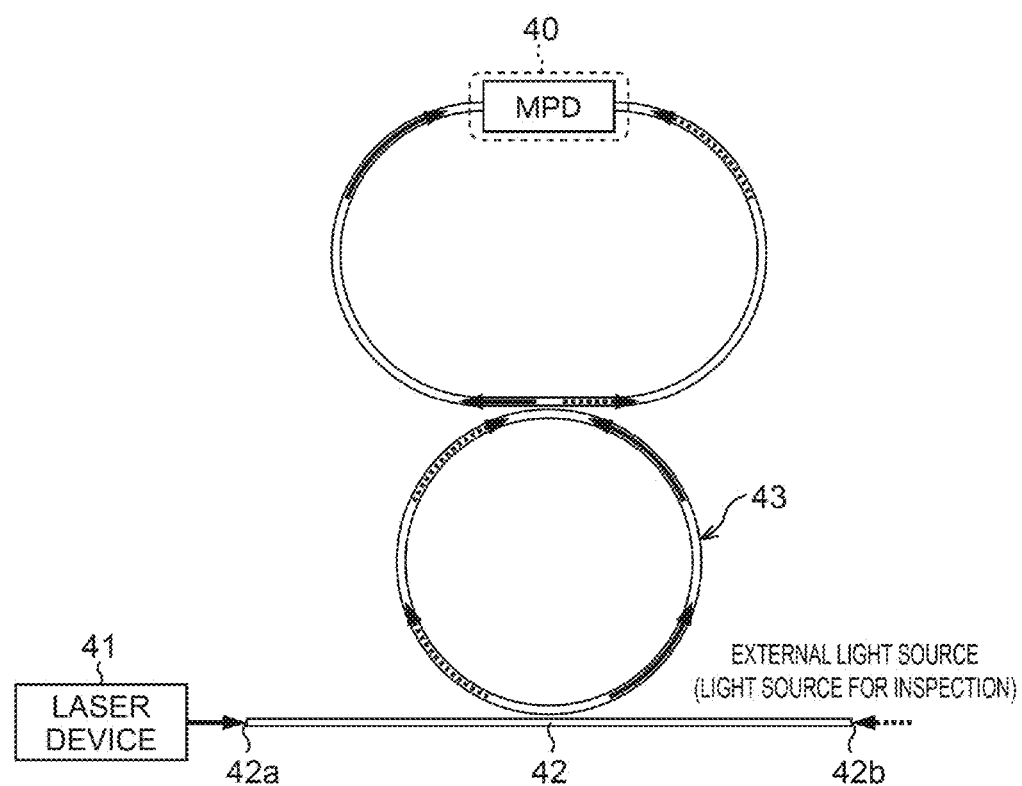
FIG. 14 is a schematic diagram illustrating a schematic configuration of an optical transmitter according to a fourth embodiment.
Figure 15:
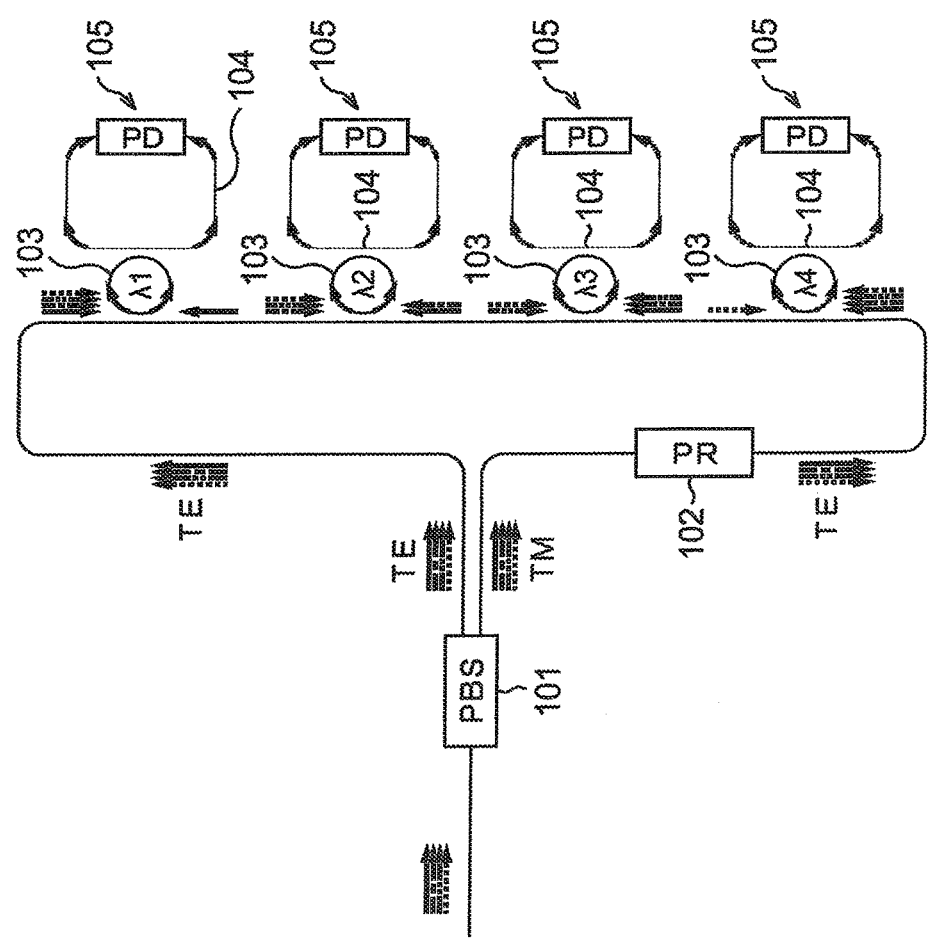
FIG. 15 is a schematic diagram illustrating a schematic configuration of a conventional polarization diversity optical receiver.

FIG. 14 is a schematic diagram illustrating a schematic configuration of the optical transmitter according to the fourth embodiment.

This optical transmitter is made up by including a laser device 41 being an internal light source, an optical waveguide 42, a ring optical modulator 43, and an optical functional device 40 according to the first or second embodiment. In the optical waveguide 42, one end is an input part 42a of laser light of the laser device 41, and the other end is an output part 42b of signal light. The ring optical modulator 43 is connected to a vicinity of a center of the optical waveguide 42. A Mach-Zehnder modulator may be used instead of the ring optical modulator 43. The optical functional device 40 serves both as a monitor photodetector for inspection and a monitor photodetector used for a control of the ring optical modulator 43 under a normal operation after the laser device 41 is mounted, and the first and second optical waveguides 2, 3 are connected to the ring optical modulator 43.

In this optical transmitter, inspection light can be introduced from the output part 42b of the optical waveguide 42 before the laser device 41 is mounted to perform the optical characteristic inspection. For example, light from a wavelength-variable light source or light in which a white light source is split is introduced as the inspection light, and thereby, it is possible to perform the spectrum inspection of the ring optical modulator 43. In the embodiment, the optical functional device 40 according to the first or second embodiment is included, and it is suppressed that the signal light which cannot be absorbed by the photodetector 1 of the optical functional device 40 returns to inside/outside the optical transmitter.

As it is described hereinabove, according to the embodiment, a high reliability optical transmitter which suppresses optical feedback without making a photodetector length long, and prevents noises and malfunctions though a frequency response bandwidth improves is enabled when signal lights are input to the photodetector 1 from both directions by applying the optical functional device 40 according to the first or second embodiment.

According to the above-stated various aspects, it is possible to suppress optical feedback and to prevent noises and malfunctions without making a photodetector length long, namely, without deteriorating a frequency response bandwidth when signal lights are input from both directions of the photodetector.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical functional device, comprising:
a photodetector which is formed in a multi-mode interferometer and has electrodes;
a first optical waveguide which is connected to one end face of the photodetector; and
a second optical waveguide which is connected to the other end face of the photodetector,
wherein light input from the first optical waveguide or the second optical waveguide, or from the first optical waveguide and the second optical waveguide to the photodetector is separated into lights in a plurality of propagation modes, the separated lights propagate in the photodetector while interfering, and a photocurrent generated by photoelectrically converting the lights is detected from the electrodes,
the light input from the first optical waveguide to the photodetector focuses image at a position physically away from the second optical waveguide, and
the light input from the second optical waveguide to the photodetector focuses image at a position physically away from the first optical waveguide.

2. The optical functional device according to claim 1, wherein the light input from the first optical waveguide to the photodetector focuses image at right and left two positions of the second optical waveguide at the other end face of the photodetector, and
the light input from the second optical waveguide to the photodetector focuses image at right and left two positions of the first optical waveguide at the one end face of the photodetector.

3. The optical functional device according to claim 2, further comprising:
a third optical waveguide and a fourth optical waveguide in which one ends are respectively connected to right and left two positions of the second optical waveguide at the other end face; and
a fifth optical waveguide and a sixth optical waveguide in which one ends are respectively connected to right and left two positions of the first optical waveguide at the one end face,
wherein the light input from the first optical waveguide to the photodetector focuses image at the third optical waveguide and the fourth optical waveguide, and
the light input from the second optical waveguide to the photodetector focuses image at the fifth optical waveguide and the sixth optical waveguide.

4. The optical functional device according to claim 3, wherein optical absorbers are connected respectively to the other end of the third optical waveguide, the other end of the fourth optical waveguide, the other end of the fifth optical waveguide, and the other end of the sixth optical waveguide.

5. An optical receiving apparatus, comprising:
an optical separation part which separates input light into TE polarization light and TM polarization light;
an optical rotation part which rotates the TM polarization light into the TE polarization light;
an optical demultiplexing part which demultiplexes the TE polarization light in accordance with a wavelength; and
an optical functional device which receives the demultiplexed TE polarization light,
wherein the optical functional device includes:
a photodetector which is formed in a multi-mode interferometer and has electrodes;
a first optical waveguide which is connected to one end face of the photodetector; and
a second optical waveguide which is connected to the other end face of the photodetector,
wherein light input from the first optical waveguide or the second optical waveguide, or from the first optical waveguide and the second optical waveguide to the photodetector is separated into lights in a plurality of propagation modes, the separated lights propagate in the photodetector while interfering, and a photocurrent generated by photoelectrically converting the lights is detected from the electrodes, the TE polarization light input from the first optical waveguide to the photodetector focuses image at a position physically away from the second optical waveguide, and the TE polarization light input from the second optical waveguide to the photodetector focuses image at a position physically away from the first optical waveguide.

6. The optical receiving apparatus according to claim 5, wherein in the optical functional device, the light input from the first optical waveguide to the photodetector focuses image at right and left two positions of the second optical waveguide at the other end face of the photodetector, and the light input from the second optical waveguide to the photodetector focuses image at right and left two positions of the first optical waveguide at the one end face of the photodetector.

7. The optical receiving apparatus according to claim 6, wherein the optical functional device further includes:

a third optical waveguide and a fourth optical waveguide in which one ends are respectively connected to right and left two positions of the second optical waveguide at the other end face; and a fifth optical waveguide and a sixth optical waveguide in which one ends are respectively connected to right and left two positions of the first optical waveguide at the one end face, wherein the light input from the first optical waveguide to the photodetector focuses image at the third optical waveguide and the fourth optical waveguide, and the light input from the second optical waveguide to the photodetector focuses image at the fifth optical waveguide and the sixth optical waveguide.

8. The optical receiving apparatus according to claim 7, wherein in the optical functional device, optical absorbers are connected respectively to the other end of the third optical waveguide, the other end of the fourth optical waveguide, the other end of the fifth optical waveguide, and the other end of the sixth optical waveguide.

9. An optical transmission apparatus, comprising:
a light source;
an optical waveguide in which one end is an input part of light emitted from the light source and the other end is an output part of signal light;
an optical modulator which is connected to the optical waveguide; and
an optical functional device which is connected to the optical modulator,
wherein the optical functional device includes:
a photodetector which is formed in a multi-mode interferometer and has electrodes;
a first optical waveguide which is connected to one end face of the photodetector; and
a second optical waveguide which is connected to the other end face of the photodetector, wherein light input from the first optical waveguide or the second optical waveguide, or from the first optical waveguide and the second optical waveguide to the photodetector is separated into lights in a plurality of propagation modes, the separated lights propagate in the photodetector while interfering, and a photocurrent generated by photoelectrically converting the lights is detected from the electrodes, the light input from the first optical waveguide to the photodetector focuses image at a position physically away from the second optical waveguide, and the light input from the second optical waveguide to the photodetector focuses image at a position physically away from the first optical waveguide.

10. The optical transmission apparatus according to claim 9, wherein in the optical functional device, the light input from the first optical waveguide to the photodetector focuses image at right and left two positions of the second optical waveguide at the other end face of the photodetector, and the light input from the second optical waveguide to the photodetector focuses image at right and left two positions of the first optical waveguide at the one end face of the photodetector.

11. The optical transmission apparatus according to claim 10, wherein the optical functional device further includes:
a third optical waveguide and a fourth optical waveguide in which one ends are respectively connected to right and left two positions of the second optical waveguide at the other end face; and a fifth optical waveguide and a sixth optical waveguide in which one ends are respectively connected to right and left two positions of the first optical waveguide at the one end face, wherein the light input from the first optical waveguide to the photodetector focuses image at the third optical waveguide and the fourth optical waveguide, and the light input from the second optical waveguide to the photodetector focuses image at the fifth optical waveguide and the sixth optical waveguide.

12. The optical transmission apparatus according to claim 11, wherein in the optical functional device,
optical absorbers are connected respectively to the other end of the third optical waveguide, the other end of the fourth optical waveguide, the other end of the fifth optical waveguide, and the other end of the sixth optical waveguide.

* * * * *